(12) United States Patent
Shah et al.

(10) Patent No.: US 11,532,158 B2
(45) Date of Patent: Dec. 20, 2022

(54) METHODS AND SYSTEMS FOR CUSTOMIZED IMAGE AND VIDEO ANALYSIS

(71) Applicant: University of Houston System, Houston, TX (US)

(72) Inventors: Shishir K. Shah, Houston, TX (US); Pranav Mantini, Houston, TX (US)

(73) Assignee: UNIVERSITY OF HOUSTON SYSTEM, Houston, TX (US)

(*) Notice: Subject to any disclaimer, the term of this patent is extended or adjusted under 35 U.S.C. 154(b) by 87 days.

(21) Appl. No.: 17/071,067

(22) Filed: Oct. 15, 2020

(65) Prior Publication Data

US 2021/0117686 A1 Apr. 22, 2021

Related U.S. Application Data

(60) Provisional application No. 62/923,675, filed on Oct. 21, 2019.

(51) Int. Cl.
*G06V 20/40* (2022.01)
*G06K 9/62* (2022.01)

(52) U.S. Cl.
CPC .......... *G06V 20/41* (2022.01); *G06K 9/6218* (2013.01); *G06K 9/6256* (2013.01)

(58) Field of Classification Search
None
See application file for complete search history.

(56) References Cited

U.S. PATENT DOCUMENTS

| | | | |
|---|---|---|---|
| 2019/0043201 A1* | 2/2019 | Strong | G06K 9/6228 |
| 2019/0197418 A1* | 6/2019 | Abutbul | G06N 5/04 |
| 2019/0197419 A1* | 6/2019 | Abutbul | G06F 16/26 |

* cited by examiner

*Primary Examiner* — Leon Flores
(74) *Attorney, Agent, or Firm* — Jackson Walker LLP

(57) ABSTRACT

Preferred embodiments described herein relate to a pipeline framework that allows for customized analytic processes to be performed on multiple streams of videos. An analytic takes data as input and performs a set of operations and transforms it into information. The methods and systems disclosed herein include a framework (1) that allows users to annotate and create variable datasets, (2) to train computer vision algorithms to create custom models to accomplish specific tasks, (3) to pipeline video data through various computer vision modules for preprocessing, pattern recognition, and statistical analytics to create custom analytics, and (4) to perform analysis using a scalable architecture that allows for running analytic pipelines on multiple streams of videos.

19 Claims, 4 Drawing Sheets

METHODS AND SYSTEMS FOR CUSTOMIZED IMAGE AND VIDEO ANALYSIS

This application claims priority to U.S. Provisional Patent Application Ser. No. 62/923,675, entitled "Methods and Systems for Customized Image and Video Analysis," filed Oct. 21, 2019, the entire contents of which are hereby incorporated by reference.

This invention was made with government support under grant 60NANB17D178 awarded by the U.S. Department of Commerce, National Institute of Standards and Technology. The government has certain rights in the invention.

BACKGROUND

This disclosure pertains to image and video analysis.

Analytics enable efficient decision making by transforming data into information. The video surveillance industry boasts success in deploying large camera networks, which produce tremendous amounts of video data. However, video analytic capabilities to translate data into information and subsequent decision making are premature. Analytics are performed in a series of steps involving pre-processing, discovery and interpretation of patterns, and statistical analysis to generate information.

Computer vision researchers, security officers (end users), and software developers are the agents in the ecosystem of video surveillance analytics. The research community works towards solving the core problems in computer vision. The core problems focus on efficient pre-processing and pattern recognition methods. The software developers gather requirements from the end users and package the vision algorithms to produce analytics.

Today video analytics are available in "blackboxes" that perform these steps as an atomic operation with minimal flexibility, which may not allow for parameter setting and tuning. Despite the staggering research efforts and their success in computer vision, few algorithms have found success in real world scenarios through this "blackboxed" approach. This failure to transition is rooted in core challenges associated with computer vision and its research paradigm that is disconnected from the end users.

Core challenges include data variability, scene variability, and limited models. Vision algorithms are often designed, tested, and optimized on datasets. While the datasets are created with an objective to encapsulate real world scenarios, it is not possible to capture all variations that can occur. The performance of the algorithms is unknown in new scenarios. This often leads to higher false alarms and limits performance. Such occurrences devalue the analytic capability. In addition, often times vision algorithms perform better under certain scene constraints. For example, most density based crowd counting approaches overestimate crowd counts when encountered with scenes that contain few people. Similarly, most detection based crowd counting approaches underestimate in crowded scenarios. A black boxed analytic based on one methods limits applicability in the other scenario. Finally, data driven algorithms are trained on annotated datasets to accomplish specific tasks. Some algorithms can be transferred to accomplish other user defined tasks, however this usually requires a retraining stage with specific data. There is a disconnect between the users and researchers. Hence such datasets, and the retraining mechanisms may not be available to the users

SUMMARY

The present disclosure relates generally to methods and systems for image and video analysis.

Building algorithms that account for data and scene variability is a compelling goal for the computer vision community. To enable successful transition of vision algorithms into analytics, the power to build, customise and perform analytics should transition from the researchers and software developers to the end user. The methods and systems disclosed herein include a framework (1) that allows users to annotate and create variable datasets, (2) to train computer vision algorithms to create custom models to accomplish specific tasks, (3) to pipeline video data through various computer vision modules for preprocessing, pattern recognition, and statistical analytics to create custom analytics, and (4) to perform analysis using a scalable architecture that allows for running analytic pipelines on multiple streams of videos.

DETAILED DESCRIPTION OF PREFERRED EMBODIMENTS

The present disclosure relates to methods and systems for image and video analysis.

Preferred embodiments described herein relate to a pipeline framework that allows for customized analytic processes to be performed on multiple streams of videos. An analytic takes data as input and performs a set of operations and transforms it into information. Video is a stream of frames; most operations in computer vision are performed on individual frame or a set of frames. To enable a non-blocking efficient processing environment, a streamline processing framework called the vision pipeline framework is utilized. The architecture allows for processing data on individual frames or a set for frames, and hence is applicable to both videos, and camera streams. Furthermore, the latter steps in the process are not in blocked state waiting for the initial steps to complete processing the entire videos. In preferred embodiments, the vision pipeline framework includes: a pipeline, modules, publishing/subscription service, streams, and a pipeline manager.

Figure 1:
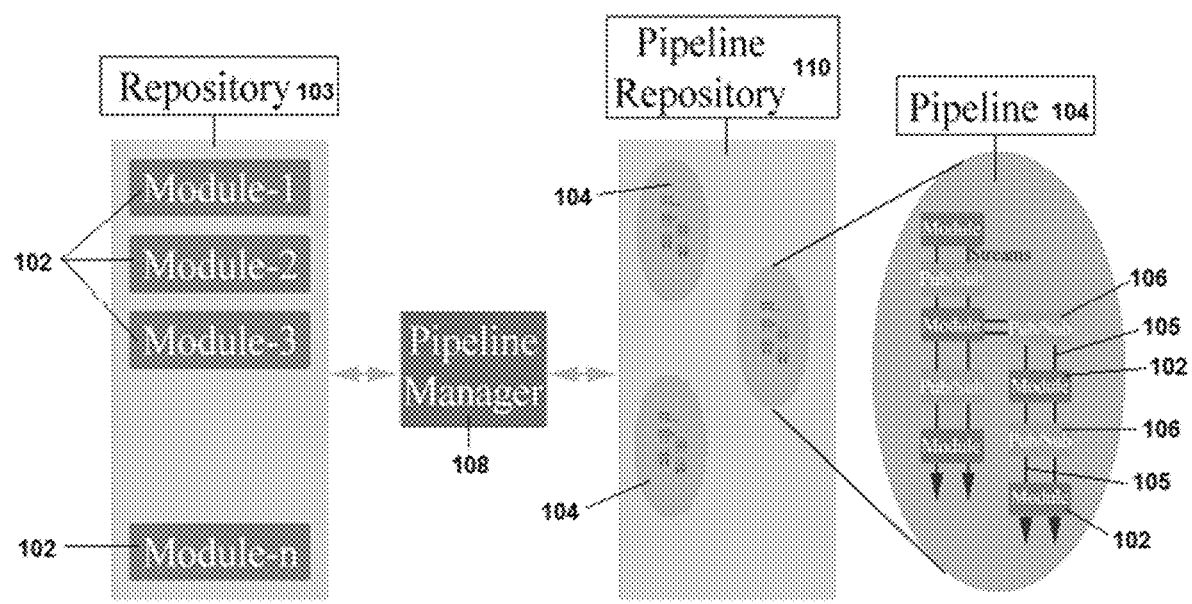
FIG. 1 shows a schematic of an exemplary pipeline framework for use in preferred embodiments of the methods and systems described herein.

FIG. 1 shows a schematic of an exemplary pipeline framework for use in preferred embodiments of the methods and systems described herein.

As shown in FIG. 1, in preferred embodiments, modules 102 are unit processing blocks in the framework, which perform a specific step in the analytic. Modules 102 are connected to form pipelines 104. The modules 102 communicate commands and data from one module 102 to the next along streams 105 using a publish/subscribe service 106. A pipeline 104 effectively takes a stream of video and computes a series of steps using the modules 102 to transform data into information. Modules 102 take a specific type of input and generates a specific type of output. The output from one module 102 should be compatible with the input to the next module 102 to allow for the flow of information. The pipeline manager 108 tracks modules in the module repository 103, and checks compatibility between modules 102 to create valid pipelines 104. The pipelines 104 are added to the pipeline repository 110, and are available to be used with various streams 105.

In preferred embodiments, a pipeline is executed in three stages: initialization, processing, and termination. Each stage is executed in sequence, and the pipeline progresses to the next stage after the previous stage has run to completion. Each stage can contain a single or multiple modules. The required setup is accomplished during the initialization stage. Tasks include fetching data and streams, loading models, and the like. The processing stage performs the steps involved in the analytic on the stream of frames. Finally, the termination stage is performed after the processing stage. Tasks such as saving outputs and sending alerts are accomplished in this stage.

Figure 2:
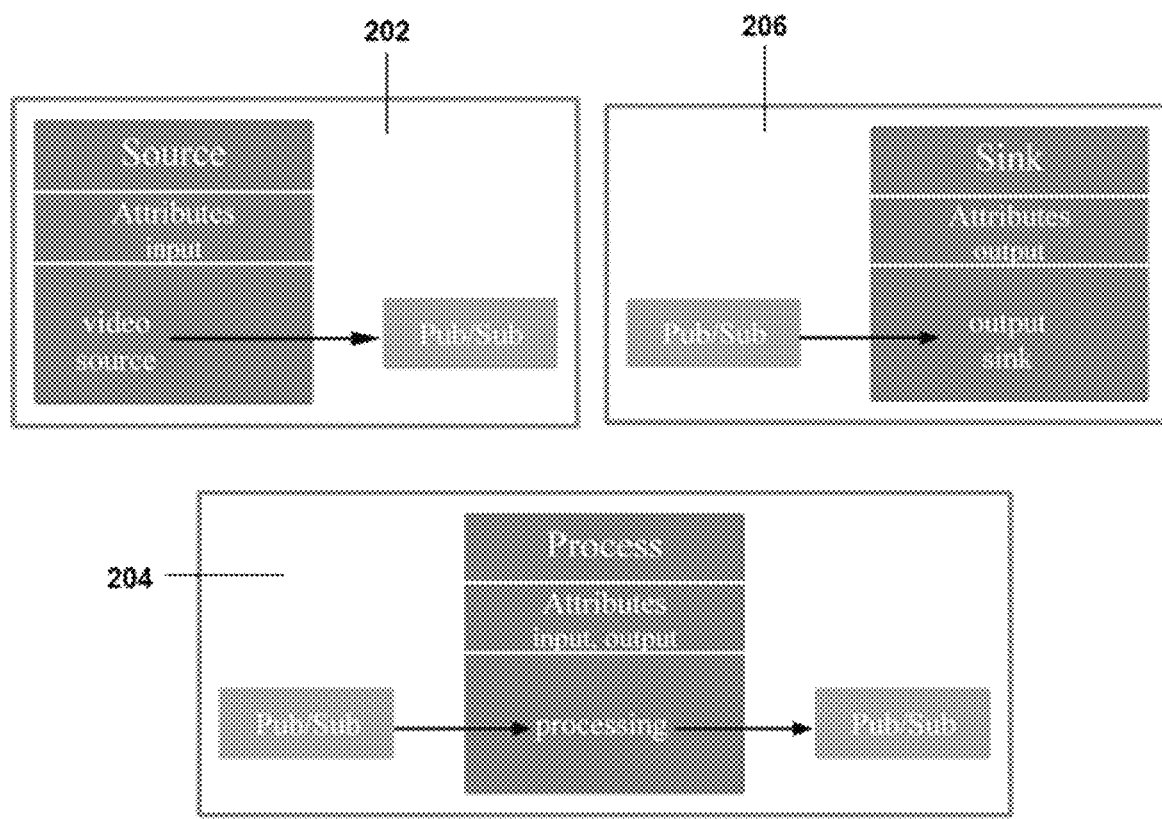
FIG. 2 shows schematics of exemplary modules used in preferred embodiments of the methods and systems disclosed herein.

FIG. 2 shows schematics of exemplary modules used in preferred embodiments of the methods and systems disclosed herein. Modules are the unit processing blocks in the framework, each of which performs a specific task. Modules can belong to any of the three stages in the pipeline. The initialization and the termination stage do not perform any streamline processing. In general, the modules that constitute the analytics, and perform the streamlined analysis, are in the processing block. Modules belonging to the processing stage can be categorized, as shown in FIG. 2, as source modules 202, process modules 204, and sink modules 206. This characterization is based on the flow of information. Source modules 202 generate data, and have an outward flow from the module, and do not have any inward flow. Process modules 204 perform analysis on the data and produce information and hence, have both an inward and outward flux of information. Finally, the sink modules 206 perform final operations on the information generated, and hence have only an inward flow of information.

Figure 3:
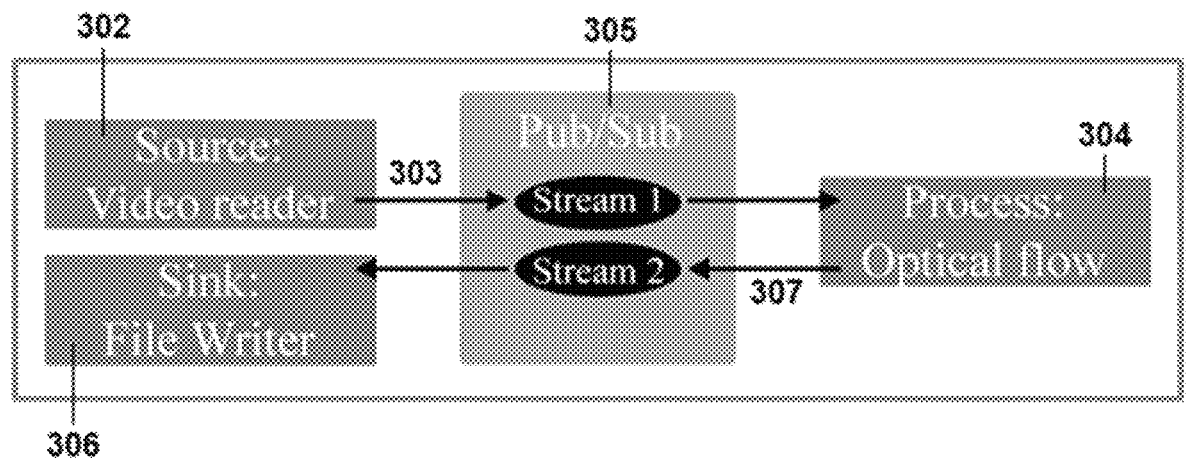
FIG. 3 shows a schematic of an exemplary pipeline that includes modules and a pub/sub service, in accordance with preferred embodiments described herein.

These modules can be put together to create pipelines that can process videos to generate information. An example is a pipeline that computes the optical flow of a video, which is shown in FIG. 3. FIG. 3 shows a schematic of an exemplary pipeline 300 that includes a source module 302 that reads a video file and publishes frames to a pub/sub service 305 on a specific message stream 303, shown as Stream 1. A processing module 304 retrieves frames (at least two frames are required to compute optical flow) from the pub/sub service 305 on the same message stream 303. The processing module 304 computes the optical flow and publishes the results to a pub/sub service 305 on a second message stream 307, shown as Stream 2. Finally a sink module 306 retrieves the optical flow values and saves them to a file.

The pub/sub service 305 shown in FIG. 3 consists of different message streams, such as streams 303 and 307, and it carries commands and information across stages and modules. Modules publish information to a specific topic and the latter stages can subscribe to streams and fetch information. The pub/sub service 305 plays a critical role in the framework because it allows for a distributed architecture where the modules can be deployed across compute nodes and communicate information, and it allows the pipeline to branch out. Any module can subscribe to an existing topic and perform computations to generate different information. For example, in the example shown in FIG. 3, an edge detection module (not shown) could subscribe to message stream 303 (Stream 1) and compute edges on images.

Figure 4:
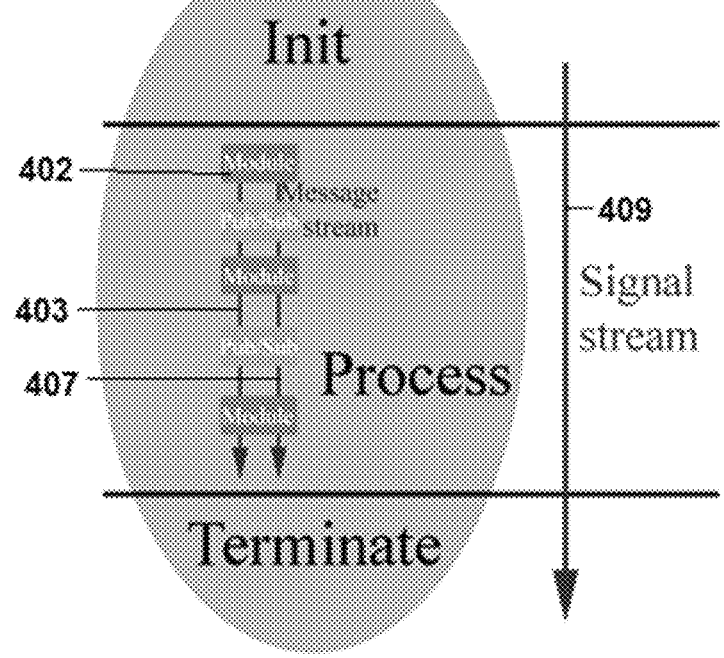
FIG. 4 shows a schematic of an exemplary pipeline with message streams and a signal stream, in accordance with preferred embodiments described herein.

In preferred embodiments, modules publish and subscribe to two types of streams: signal and message streams. Signals that enable streamline execution of the pipeline are sent over the signal stream; data and information are sent over the message stream from one module to the latter. Streams 303 and 307 shown in FIG. 3 are message streams. FIG. 4 shows a schematic of a pipeline 400 with message streams 403 and 407, as well as signal stream 409. Signal stream 409 runs across all the stages in the pipeline 400, and the message streams 403 and 407 run across all the modules 402 in the processing blocks. Most streams are unidirectional. In general, the signal either communicates the end of a module or the end of a stage. The following signals are exemplary signals that could be defined in frameworks used in preferred embodiments of the methods and systems described herein: End Init Stage, End Processing Stage, and End Message. The last module in the init stage publishes the End Init Stage message to indicate the end of initialization stage. The process modules begin execution after this signal is received. The last module in the process stage publishes the End Processing Stage message to indicate the end of the processing stage. The terminate modules being execution after this signal is received. The process modules publish an End Message message along the signal stream after all the messages have been published to the message stream.

The pipeline manager, shown in FIG. 1 as 108, maintains the modules in the framework. Each module defines the input type it accepts, and the output type it produces. In other words, each module in the system expects a certain type of input, such as an image, floating point number, Boolean values, and the like, and each module produces a certain type of output, also such as an image, floating point number, Boolean values, and the like. In order to add a new module to form a pipeline, the output produced by the last module in the pipeline should be compatible with the input of the new module. The pipeline manager checks compatibility between two modules and maps the output from one module to the input of the next and connects them. Thus, when a request is made to add a new module to the pipeline, the pipeline manager considers the output of the last module in the pipeline, and checks the repository for all modules whose input is compatible with this output, and returns a list of suitable modules. The list of suitable modules will change based on compatibility with the output of the previous module.

In preferred embodiments, the modules in the pipeline framework may include one or more modules for downloading video, reading video, producing images, detecting objects, filtering objects, counting objects, comparing object counts to selected thresholds, feature extraction, background modeling, edge modeling, interest point modeling, reference image modeling, feature distance detection, comparing feature distance to selected thresholds, generating alerts, and uploading results. In additional preferred embodiments, the output from the pipeline comprises information for estimating crowd density, monitoring parking violations, or detecting camera tampering.

In preferred embodiments, the pipeline framework described herein can be used to create datasets. Algorithms can be trained to create modules that perform specific tasks.

Then analytics can be designed by creating pipelines of modules to generate information from data.

Preferred embodiments of the vision pipeline framework can be implemented to run on both videos and live streams. Today surveillance cameras are deployed in large numbers, and analytics are run on live streams for proactive monitoring and decision making, and on stored videos for forensic purposes. A scalable implementation allows video surveillance operators to run analytics on multiple video and live streams simultaneously. The implementation may include, in some embodiments, an API web server, a front end application, the pipeline framework described herein, and a compute cluster.

Figure 5:
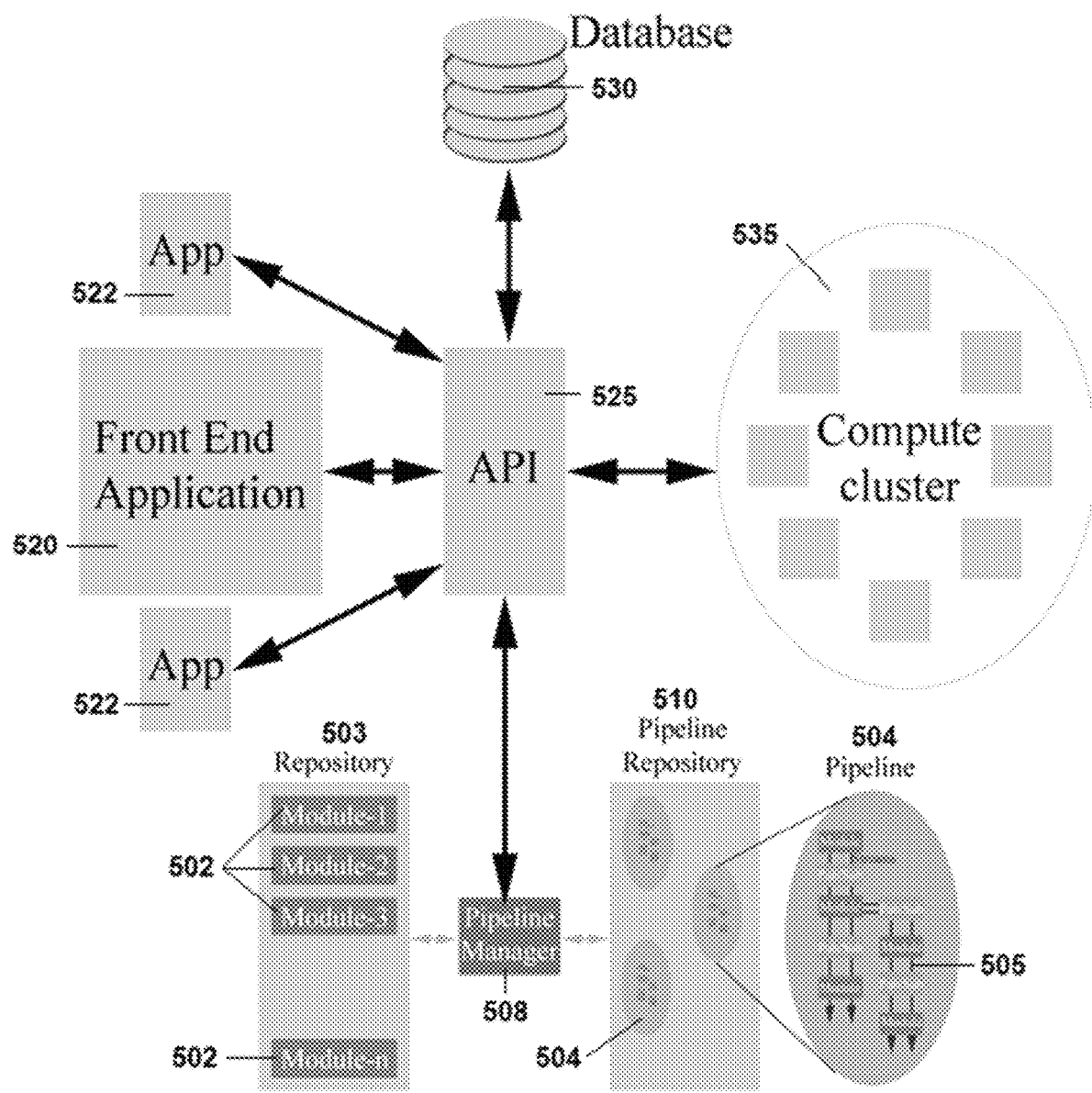
FIG. 5 shows a schematic of an implementation of a vision pipeline framework for surveillance analytic applications, in accordance with preferred embodiments described herein.

FIG. 5 shows a schematic of an implementation of a vision pipeline framework for surveillance analytic applications, in accordance with preferred embodiments described herein. The front end application 520 allows the user to upload videos and add live streams for processing. The API web server 525 acts as an interface between all the components, and saves the videos and information in the database 530, and allows for create, read, update and delete (CRUD) operations. It decouples the front end from the framework implementation, and allows for the construction of an assortment of clients including software applications 522, which may be web applications, desktop applications, or mobile applications. The API web server 525 consults with the pipeline manager 508 and gathers information regarding the existing modules 502, pipelines 504, and their validity; and communicates the information to the front end application 520. The API web server 525 takes requests from the front end application 520 and creates new pipelines 504 and adds them to the pipeline repository 510. The front end application 520 requests the API web server 525 to run specific pipelines 504 on various videos and live streams 505. The pipelines are run on the compute cluster 535 and the results are communicated to the API web server 525 that then saves it in the database 530.

Figure 6:
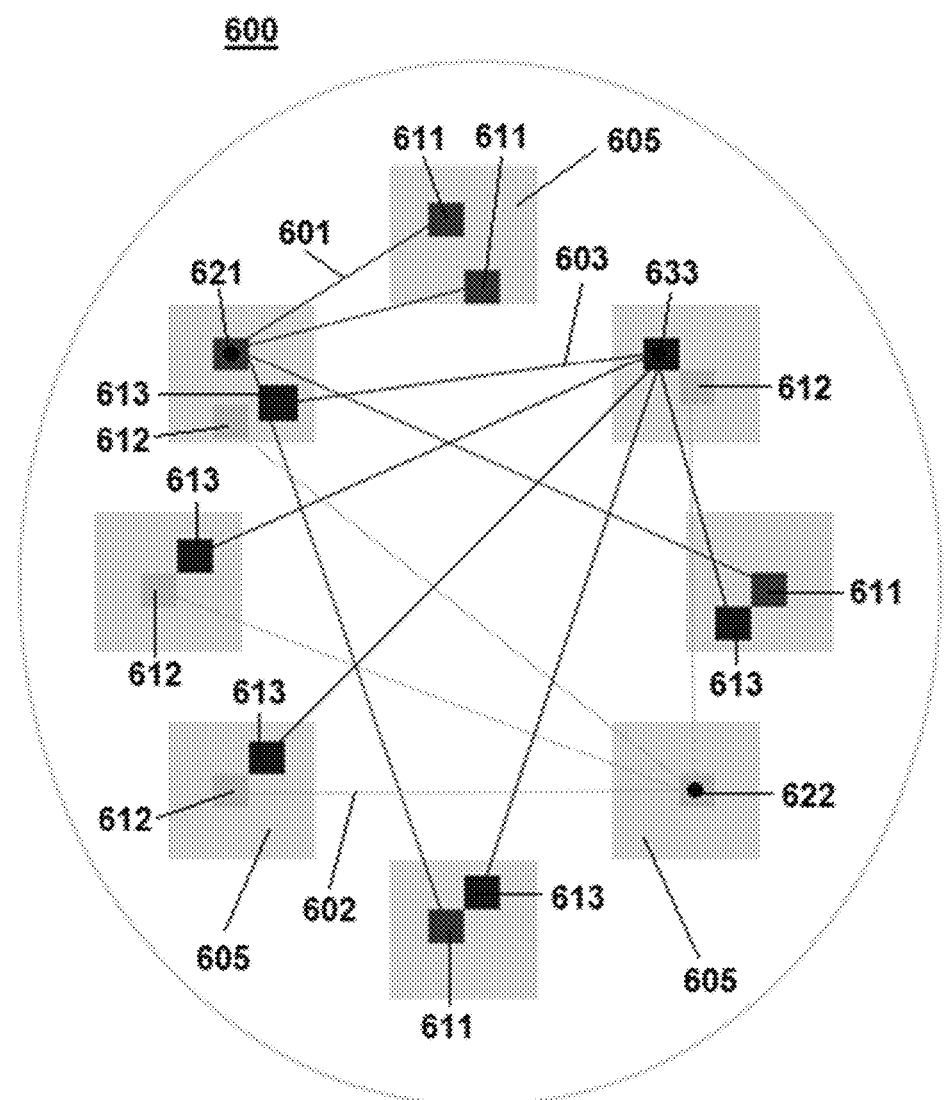
FIG. 6 shows an example of three pipelines deployed on a compute cluster, in accordance with preferred embodiments disclosed herein.

Additional preferred embodiments relate to a computerized implementation on a compute cluster for scalable computer vision applications. The modules are available as containers, and they are deployed across a set of nodes in the cluster. All the containers that belong to a single pipeline share resources such as networking and storage, like being deployed on the same computer. Each pipeline initiates its own pub/sub server, which is available as a container and is deployed on a node. A new pipeline is created to run on each stream or video. FIG. 6 shows an example of three pipelines 601, 602, and 603 deployed on the cluster 600, in accordance with preferred embodiments disclosed herein. For pipeline 601, each connected square represents a module 611, and the square that forms the "hub" is the pub/sub server 621 in a container. Each module 611 publishes information and signal to the pub/sub server 621 within the pipeline 601. Other modules 612 and 613 in the pipelines 602 and 603 fetch information from their respective pub/sub servers 622 and 623. Modules 611, 612, and 613 and pub/sub servers 621, 622, and 623 are deployed across nodes 605 in cluster 600.

Implementations such as that shown in FIG. 6 can, in some embodiments, be realized using Kubernetes. Kubernetes (K8s) is an open-source system for automating deployment, scaling, and management of containerized applications. It groups containers that make up an application into logical units for easy management and discovery. Containers belonging to the same pipeline can be bound into a single unit, that shares resources. K8s can track resources across nodes in the cluster and allocate containers based on availability. K8s can schedule jobs, and deployments. Failed containers are restarted to ensure the pipelines run to completion. Furthermore, pipelines that need to run over extended periods of time can be executed as deployments, where all the containers are monitored, scheduled, and restarted as necessary. K8s manage network routing across containers to communicate with each via local IP addresses and ports, and can mount storage devices to make common storage available for all containers in the pipeline.

Preferred embodiments of the methods and systems described herein relate to software and a software user interface for analyzing images and video. The software may utilize Kubernetes. Preferred embodiments of the user interface allow a user to upload pre-recorded video or connect a live video stream. Preferred embodiments of the interface also allow a user to review processed results and to (a) see video playback, (b) see a chart/graph of summarized output values of video analytic, (c) see a chart/graph with alerts, and/or (d) select a timepoint on a graph to see a corresponding timepoint in video. Preferred embodiments of the interface also allow a user to edit/delete processed results. The interface should preferably also allow the user to design a custom video analytic, including one or more of the following: (a) show a list of modules available for processing video, (b) select and show a list of available video sources (prerecorded videos or live video streams), (c) select from available modules for processing selected video source, (d) enter parameters values for a selected module, if applicable, (e) draw a region of interest on a sample image from a chosen video source, if applicable, (f) update a list of modules to ones that are compatible to previously selected modules for building a custom analytic, (g) allow a user to name and save a designed analytic, and (h) allow a user to edit/delete a previously saved analytic. Preferred embodiments of the interface also allow a user to view video sources such as by one or more of (a) showing a list of video sources, (b) selecting from available video sources, (c) viewing a number of video analytics associated with a selected video source, and (d) select from associated video analytics to see processing status and results.

Example 1. Crowd Counting Alert

An example use case is a surveillance scenario that performs crowd counting on a stored video and produces alerts when the count exceeds a maximum threshold value. The video is available in a storage location. The pipeline constitutes the following components:
  A. Init stage: The init stage contains a download module that fetches the video from the storage location into the pipeline.
  B. Processing stage: The processing stage constitutes four modules: (1) a source module that reads the downloaded video and produces images, (2) a process module that takes frames and estimates the crowd density and produces a count from each frame, (3) a process module that takes a single number as input and compares it against a threshold to generate alerts, and (4) a sink module that takes the alerts as input and saves them to a file.
  C. Terminate stage: The terminate stage contains a module that uploads the results to a database.

In this example, the pipeline is executed in multiple steps. First, the Download module in the init stage fetches the video file from the storage. Upon execution, because it is the last module in the init stage, it publishes an end init stage signal on the signal stream. The processing modules, which were in a blocked state, begin execution once the end init stage message is received, and the modules in the processing stage begin execution. The source module reads the video and publishes to a topic 1 on the message stream. An end message is published after all the frames have been published. The crowd counting module simultaneously reads the images from topic 1 on the message stream, computes density, and publishes the results to topic 2 on the message stream. Similarly, the thresholding module reads from topic 2 and publishes alerts to topic 3. The sink module then fetches alerts and saves them to a file. The sink module, being the final module in the processing stage, publishes an end process stage message on the signal stream. The terminate stage, which was in a blocked state, begins execution on receiving the end process stage message. The upload module then saves the results to a database.

Example 2. Crowd Counting and Parking Violations

An exemplary software application allowing a user to upload video and run analytics was used to evaluate the current system and methods. The software had the capability to upload video, playback video, and perform CRUD operations. For each video the user could run a custom analytic that was created in the Design Analytic tab. The menu bar had three menu buttons Upload Video, Results, and Design Analytic. The Upload Video showed a file explorer that allowed the user to choose videos to upload. The uploaded videos were displayed on the screen.

After selecting the Design Analytic tab, the display showed all the available modules on the left hand side. The user could choose modules to create pipelines. Each module was added to the central frame by clicking the "Add" button. Once the pipeline was created, the "Create" button at the bottom was clicked. The right hand frame showed all the available pipelines that had been generated. Each pipeline was available to run on the uploaded videos. The video could be expanded to see further details about the results of the pipeline.

After selecting the Results tab, the display showed all the analytics that had been run on the videos and their status. Each video was marked with the status of whether a pipeline had executed successfully, or if there were any alerts produced.

One example of a use for the software is crowd counting. Crowd counting has received a great deal of attention in the recent past. Crowd counting has applications in security, advertisement, and resource management. Surveillance cameras can be used to monitor crowd counts to enhance security and prevent lost to property and life. Crowd related abnormalities include riots, protests, and the like. This example shows the steps used to create an analytic that tracks crowd count and generates alerts when the count exceeds a maximum expected value.

In a first step, "videosource" was chosen as an input. The "videosource" module was selected and added to the analytic pipeline in the central frame. The left hand frame showed the other available modules that could be added. A crowd density computation module was also added. The crowd counting module takes images as input and produces a matrix of numbers where each element contains the density value for that pixel in the original image. MCNN is a multi-column neural network that is trained on images to perform crowd density estimation. Thus, the crowd counting module was labeled "mcnn." Since the output of mcnn is a matrix of numbers, the pipeline manager checked the repository to find all modules that take a matrix of numbers as input, and these modules were displayed on the left hand side of the screen. This list changed dynamically depending on which modules were compatible with the output of the last module, at each stage. An "add" module was also added to the analytic pipeline. This sum module could also be labeled "Core." The crowd count was obtained by accumulating all the density values in the density map. The "add" module took matrices as input and accumulated them and output the sum. Available modules that are compatible with the output of the "add" module, as selected by the pipeline manager, were also shown on the screen. These included a "thresholding" module, which was added from the list of available modules. The crowd count was thresholded to generate alerts when the crowds exceeded an upper limit. The threshold module was added with an upper limit of 100. In a last step, the crowd counting analytic was saved. A name for the analytic pipeline can be added and it can be saved. The software allows the user to run the created analytic on any video. When the analytic was run on a video, a graph of the crowd count for each frame in the video was shown. The darker points in the graph identified frames at which the crowd count has exceeded the upper limit.

The software was also used to perform a no parking alert analytic on a video. This analytic generates alerts when a car is parked in a no parking location. In this analytic, all the objects in the scene are detected. Then the object detection results are filtered to ignore all the objects except for cars. Then a bounding box is created to indicate the location of the no parking area. Then a video is added as a source and checked to see if any cars are detected in this area over a persistent amount of time. A "videosource" module and an object detection module, labeled as "yolov3," were added to the analytic. This particular object detection module used an image as an input and identified and localized objects in the image. The module was trained to detect various objects in the scene, and produced a list of bounding boxes, along with their corresponding object classes. In a next step, an object filter was added to accept cars. This module filtered the bounding box based on the object type and was shown on the left hand side as Object Detection, "filterbyclass." It isolated objects that belonged to the "car" category and ignored the rest. The user can define custom filters based on which objects to filter out. Here the user entered "cars" to filter out objects that were not cars. In a further step, a location filter was added to look for objects within certain areas of the image. A module was added that filtered out objects if they appeared in certain regions of the image. This module was shown in the left hand side as Object Detection, "filterbylocation." The user can choose a certain area of the image by dragging the mouse across the image. The module will inspect each object to check if it is located within this box. In this case the user drew a box around the no parking area. In a further step, an object counting module was added. The objects had been filtered by the class and location. The user can now count the number of objects that have passed through these filters by adding a count module that accumulates the number of objects. Here, the Core "count" module was added to the analytic. In a further step, the user added an Alert module which checked to see if objects were present within the box defined by the user over some persistent amount of time. The user accomplished this by adding a "movingaverage" Alert module. The module raises an alert if a car is persistently detected over a period of 10 seconds. The user can save the analytic and run it on the intended video. After running the analytic on sample videos, the results included a graph that indicated the location in the video where the alert had been raised. The user can click on the point in the graph to review the video. The video shows the alert generated by the analytic as the car is parked in the no parking area.

Example 3. Detection of Camera Tampering

A preferred embodiment of the methods and systems described herein relates to methods for detecting camera tampering involve comparing images from the surveillance camera against a reference model. The reference model represents the features (e.g. background, edges, and interest points) of the image under normal operating conditions. The approach is to identify a tamper by analyzing the distance between the features of the image from surveillance camera and from the reference model. If the distance is not within a certain threshold, the image is labeled as a tamper. Modules that may be used in the pipeline for the detection of camera tampering include feature extraction, reference modeling, and decision mechanism.

The feature extraction module can be further made up of background modeling, edge modeling, and interest point modeling modules.

Background Modeling. Background refers to the elements of a scene that do not undergo motion or changes. Many methods have leveraged this idea to model background as a feature for detecting tampers. Background can be modeled using frame differencing, mixture of Gaussians', and code books.

The absolute difference between the reference and test background has been used to compute a residual for detecting moved and covered tampers. Two backgrounds separated by a time delay were modeled to compute the residual. The first was used as a reference and the latter as the test image for detecting moved tampers. The entropy of two backgrounds was computed and the difference used as a residual to detect covered tampering. The histogram has been computed and the concentration in the lower intensity bins of the histogram has been used as a feature. The difference in concentrations of the reference and the test images, has been used as a residual to detect covered tampering.

Edge Modeling: Edges correlate with sharp intensity changes in the image. Edges can be computed using pixel-wise gradient; spatial filters like Sobel and Prewitt; frequency filters like Gaussian high pass filter; and robust edge detection methods like canny edge detector. A camera operating out-of-focus has indistinct edges. A camera that is covered or moved results in disappearance of edges that are present in the reference image. The intersection of edges between the test and reference image has been used to compute a residual, and use the residual value to detect covered and moved tampers. Defocusing degrades edge content. Pixel wise gradient has been used to filter the edge content. Difference between the accumulated magnitude of the gradients has been used as a residual. High frequency content in an image corresponds to the sharp changes in the image. The co-efficient of high frequency components has been accumulated as a feature. Wavelet transform has been applied to obtain the frequency content in the image. A similar approach applied discrete Fourier transform. The entropy of the edges has been used as a feature for detecting covered tampering. The features described so far quantify the magnitude of gradients/edges in the image. A histogram of oriented gradients (HOG) has been used as a feature. This captures the orientation of gradient as well. The sum of absolute difference between the HOGs of reference and test images has also been used as a residual.

A combination of background and edges can also be used to extract robust features. Edge detection has been applied on the background image and used as a feature for detecting tampering. The high frequency content of the background image has been used as a feature for detecting defocusing.

Interest Points Modeling: These methods assume that the location of interest points in the image remain fixed under normal operating conditions. SIFT (Scale invariant Feature Transform) and SURF (Speeded Up Robust Features) are common algorithms used to identify keypoints in reference and test images. A residual is computed by comparing the two sets of interest points. The difference in number of interest points has been used as a residual. SIFT based image descriptors have been used as a feature, and the difference between them has been used as a residual for detecting covered and moved tampers. The global motion has been estimated by matching SIFT points between the reference and test image. The displacement has been used as a residual to detect moved tampers.

The reference modeling module generates the expected feature under normal operating conditions. The residual is computed by comparing this against the features of the test image. The input to reference model is usually a set of images. The reference image ideally represents the camera under normal operating conditions. This data is not available. A general strategy is to assume temporal constancy. Under this assumption, frames from the immediate past are used as reference images. A common technique is to use a linear combination of the reference images to arrive at a reference value. This technique allows the system to adapt with naturally occurring illumination changes, like dusk, dawn, etc. The background reference image has been updated using a moving average model, and the edges have been accumulated over a set of frames to form reference edges.

However, assuming temporal constancy has disadvantages. If images in the immediate past are tampered, then the model accumulates these features as well. The model drifts and fails to detect tampering. Adversely, the system falsely identifies normal frames as tampered. Selectivity is a common technique to avoid this, where frames identified as normal are selectively included in the model. However, performance of the system is contingent on its ability to detect tampering.

The reference modeling module may include a generative model for estimating reference images. Until recently, it has been difficult to learn the probability density function of the images captured by a surveillance camera. Hence, generative models are not commonly practiced. However, with the recent advancement in training complex deep neural network architectures, it is possible to learn such distributions. A generative adversarial training scheme has been proposed that can learn probability density function of the features. Generative adversarial network (GAN) is a neural network architecture that is capable of sampling features from the learned probability density function. The gap between GAN and convolutional neural networks (CNN) has been bridged using a deep convolutional generative adversarial network that is capable of learning a hierarchy of representations from an image dataset. This is capable of generating images with visual similarity to the training images. GANs have found applications in multiple facets. They have been shown to enhance resolution, create images from text, generate face images, and generate CT images from MRI.

The detection mechanism analyzes the distance between features of the reference image and test image and labels the image as either tampered or normal. It takes as input a residual value and maps it to a decision. A linear decision boundary using a thresholding scheme has been the norm. Some methods have proposed multiple thresholds. An adaptive threshold has been proposed, producing a non-linear boundary to cope with the complexity. However, a thresholding mechanism has limitations. A parameter tuning is required to choose an appropriate threshold. A non-linear decision making capability is required to cope with the complexity of surveillance cameras. The present methods use a Siamese network as a detection mechanism. This allows us the creation of a non-linear mapping (transformation) of the input to a new feature space. The network takes as input two images and minimizes the distance between transformed features of the normal image, while maximizing the distance between transformed features of the tampered and normal images.

What is claimed is:

1. A method for performing an analysis on selected images or videos to obtain information from the images or videos, comprising:
    selecting an image or video for analysis;
    selecting modules from a module repository to perform steps in the analysis, wherein each module performs a specific step in the analysis, and wherein each module accepts a type of input and generates a type of output;
    arranging the modules to produce a pipeline containing a sequence of modules, wherein the pipeline is an analytic, wherein output generated from one module in the sequence is compatible with input accepted by a subsequent module in the sequence, and wherein each module in the pipeline belongs to a stage of the pipeline selected from initialization, processing, and termination;
    executing the pipeline using the modules, wherein signals carried on a signal stream control actions taken by the sequence of modules, and wherein the modules publish data and information to at least one message stream running from one module in the sequence to a subsequent module in the sequence; and
    generating an output from the pipeline, wherein the output comprises information from the image or video.

2. The method of claim 1, further comprising the step of storing the pipeline in a pipeline repository.

3. The method of claim 2, further comprising the steps of selecting a second image or video for analysis, selecting the pipeline from the pipeline repository, and executing the pipeline to generate a second output from the pipeline, wherein the second output comprises information from the second image or video.

4. The method of claim 1, wherein the pipeline consists of initialization modules, processing; modules and termination modules.

5. The method of claim 4, wherein the processing modules are source modules, process modules, or sink modules.

6. The method of claim 1, wherein the modules utilize algorithms trained to perform tasks for image or video analysis.

7. The method of claim 1, wherein the modules perform steps comprising one or more of downloading video, reading video, producing images, detecting objects, filtering objects, counting objects, comparing object counts to selected thresholds, feature extraction, background modeling, edge modeling, interest point modeling, reference image modeling, feature distance detection, comparing feature distance to selected thresholds, generating alerts, and uploading results.

8. The method of claim 1, wherein the output from the pipeline comprises information for estimating crowd density, monitoring parking violations, or detecting camera tampering.

9. The method of claim 1, wherein the image or video is recorded or live.

10. The method of claim 1, wherein the steps are performed by a user, and wherein the user inputs instructions for carrying out each step into a software program having a user interface.

11. The method of claim 10, wherein the user interface allows the user to upload pre-recorded video or images or connect a live video stream prior to selecting an image or video for analysis, view video sources prior to selecting an image or video for analysis, review output generated by the pipeline, edit or delete output generated by the pipeline, and design a custom video analytic, wherein the custom video analytic comprises selected modules arranged to produce a pipeline.

12. A system for performing an analysis on selected images or videos to obtain information from the images or videos, comprising:
    a module repository;
    at least two modules stored in the module repository, wherein each module performs a specific step in the analysis, and wherein each module accepts a type of input and generates a type of output;
    a pipeline manager, wherein the pipeline manager selects and arranges modules to produce a pipeline containing a sequence of modules, wherein the pipeline is an analytic, wherein each module in the pipeline belongs to a stage of the pipeline selected from initialization, processing, and termination, and wherein output generated from one module in the sequence is compatible with input accepted by a subsequent module in the sequence;
    a signal stream that controls actions taken by the sequence of modules;
    a pub/sub server that communicates at least one message stream running from one module in the sequence to a subsequent module in the sequence, wherein the modules publish data and information to the message stream; and
    a pipeline repository for storing pipelines produced by the pipeline manager.

13. The system of claim 12, wherein the modules consist of initialization modules, processing modules, or termination modules.

14. The system of claim 13, wherein the processing modules are source modules, process modules, or sink modules.

15. The system of claim 12, wherein the modules utilize algorithms trained to perform tasks for image or video analysis.

16. The system of claim 12, wherein the modules perform steps comprising one or more of downloading video, reading video, producing images, detecting objects, filtering objects, counting objects, comparing object counts to selected thresholds, feature extraction, background modeling, edge modeling, interest point modeling, reference image modeling, feature distance detection, comparing feature distance to selected thresholds, generating alerts, and uploading results.

17. The system of claim 12, wherein the pipeline produces information relevant to estimates of crowd density, parking violations, or camera tampering.

18. The system of claim 12, further comprising a software program having a user interface, wherein the software program facilitates communications within the system, and wherein the user interface allows a user to input instructions for performing the analysis on selected images or videos using the system.

19. The system of claim 18, wherein the user interface allows the user to upload pre-recorded video or images or connect a live video stream prior to selecting an image or video for analysis, view video sources prior to selecting an image or video for analysis, review output generated by the pipeline, edit or delete output generated by the modules, and design a custom video analytic, wherein the custom video analytic comprises selected modules arranged by the pipeline manager.

* * * * *

UNITED STATES PATENT AND TRADEMARK OFFICE
CERTIFICATE OF CORRECTION

PATENT NO. : 11,532,158 B2
APPLICATION NO. : 17/071067
DATED : December 20, 2022
INVENTOR(S) : Shishir K. Shah et al.

It is certified that error appears in the above-identified patent and that said Letters Patent is hereby corrected as shown below:

In the Claims

In Column 11, Line 55, Claim 4, delete "processing;" and insert -- processing --, therefor.

Signed and Sealed this
Twenty-eighth Day of November, 2023

Katherine Kelly Vidal
*Director of the United States Patent and Trademark Office*